June 14, 1927.

T. A. RICH 1,632,623

ELECTRIC MEASURING INSTRUMENT

Filed Oct. 19, 1926

Inventor:
Theodore A. Rich,
by *Alexander S. ____*
His Attorney.

Patented June 14, 1927.

1,632,623

UNITED STATES PATENT OFFICE.

THEODORE A. RICH, OF EAST LYNN, MASSACHUSETTS, ASSIGNOR TO GENERAL ELECTRIC COMPANY, A CORPORATION OF NEW YORK.

ELECTRIC MEASURING INSTRUMENT.

Application filed October 19, 1926. Serial No. 142,722.

My invention relates to improvements in electric measuring devices and instruments of the magnetic vane type. This type of instrument operates upon the principle of the repulsion, or attraction, between movable and fixed magnetic vanes arranged inside of an energizing coil. The instrument here described is of the repulsion type. The vanes are arranged parallel to the axis of the coil, and one or both may vary in width or cross-section so as to alter the scale distribution. These magnetic vanes ordinarily occupy a very small percentage of the cylindrical space inside of the coil, and as a consequence comparatively little of the total flux produced by the coil is utilized in producing torque.

I have discovered that if the energizing winding of such an instrument be divided into two opposing coils arranged one inside of the other and separated by a substantially cylindrical space wherein the magnetic vanes are placed, the flux acting upon the vanes is materially increased in proportion to the total flux. This not only results in a more efficient instrument, but other improvements are realized, the most important of which is a very material decrease in the inductance of the instrument, with a corresponding decrease in errors due to frequency changes when used on alternating current circuits.

Figure 3:
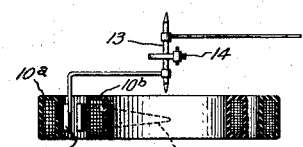
Figure 4:
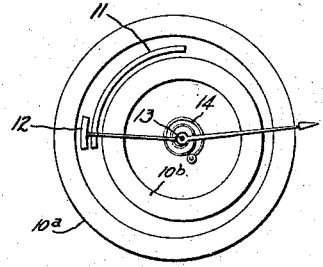

The features of my invention which are believed to be novel and patentable will be pointed out in the claims appended hereto. For a better understanding of my invention, reference is made in the following description to the accompanying drawings which show in Figs. 1 and 2 different views of this type of instrument known to the prior art; Figs. 3 and 4 show by way of comparison corresponding views of the instrument as modified in accordance with my invention; and Figs. 5 and 6 show the radically different nature of the flux distribution in the two instruments.

Figure 1:
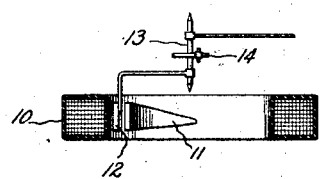
Figure 2:
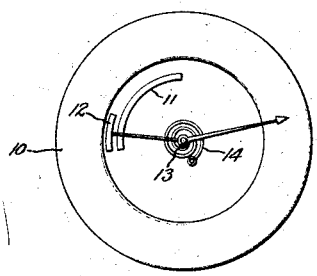

Referring to the drawings, Fig. 1 represents a vertical cross-section through a repulsion iron vane instrument as usually built, and Fig. 2 shows a plan view of this instrument. It comprises the cylindrical energizing winding 10, a fixed magnetic vane 11 of tapering width, and a movable iron vane 12 of constant width secured to a pointer shaft 13. These vanes are curved to conform to the internal curvature of the coil and when the coil is energized the two vanes are magnetized with like polarity and a repulsion exists between them which causes the instrument to deflect against the torque of a spiral spring 14. The condition of maximum deflection is indicated in the drawing.

In accordance with my invention, the energizing winding is divided into two parts $10^a$ and $10^b$, as shown in Figs. 3 and 4. The other parts of the instrument are the same is in Figs. 1 and 2. Windings $10^a$ and $10^b$ are wound in opposite directions, or are connected in series or in parallel, as desired, to produce fluxes in opposite directions through their axes, and are arranged one inside of the other so as to leave a cylindrical space between them wherein the magnetic vanes are placed. Preferably, the two coils $10^a$ and $10^b$ are arranged slightly off center so as to leave a larger air gap on that side where the magnetic vanes are placed. In Fig. 1 the flux spreads out and occupies the entire space in the interior of the coil. In the case of Figs. 1 and 2, let us consider the magneto-motive force acting upon the area inclosed by the coil to be positive. Now, if we introduce another coil $10^b$ as in Figs. 3 and 4 such that the magneto-motive force over the area inclosed by it is negative, it is evident that the direction of magneto-motive force produced by this coil outside the area inclosed by it will be positive. The introduction of the second inner coil thus decreases the magneto-motive force over the area inclosed by it, and increases the magneto-motive force over the area between the two coils. By the proper selection of windings, it is possible to reduce the flux within the inner coil nearly to zero. Using this arrangment, I have found that for the same ratio of torque to total ampere turns as in a single coil instrument the inductance of the new instrument is reduced over 80 per cent.

Figure 5:
Figure 6:

The vast difference in the flux distribution is shown by way of comparison in Figs. 5 and 6. These figures are reproduced from photographs which were produced by laying a sheet of paper over the two instruments and scattering iron filings thereon and photographing the resulting distribution. The flux distribution of the old instrument is shown in Fig. 5; that of the new in Fig. 6. These photographs were taken with the iron vanes in place. The absence of iron filings directly over the vanes as indicated in Fig. 6 indicates the zone of intensive repulsion between the vanes.

The inductance of the new instrument is very much less than that of the old instrument, due to the fact that we have two coils connected in series which are substantially bucking each other. The effect is the same as is produced by arranging wires carrying opposite currents close together to reduce the inductance. As a result of this very material reduction in inductance, the instrument when used as an alternating current voltmeter, for example, has a very small frequency error as compared to previous instruments of this type. The same principle applies where the instrument is of the attraction type with the relatively movable vanes arranged axially with respect to each other instead of radially.

In accordance with the provisions of the patent statutes, I have described the principle of operation of my invention, together with the apparatus which I now consider to represent the best embodiment thereof, but I desire to have it understood that the apparatus shown and described is only illustrative, and that the invention may be carried out by other means.

What I claim as new, and desire to secure by Letters Patent of the United States, is:—

1. An electric measuring device of the magnetic vane type having a pair of substantially cylindrically shaped energizing coils placed one inside the other and connected to produce fluxes in opposite directions through their axes, and having relatively movable magnetic vanes mounted between said coils.

2. An electric measuring instrument of the magnetic vane type having a pair of cylindrical energizing coils spaced apart one inside the other and slightly non-concentric with respect to each other so that a crescent-shaped annular air gap is provided between them, said coils being connected to produce fluxes in the same direction through said air gap and relatively movable magnetic vanes mounted in the larger portion of said air gap.

3. An electric measuring instrument comprising a pair of substantially cylindrically shaped energizing windings arranged one inside the other and spaced apart so as to leave a cylindrical air gap between said wingings, said wingings being connected to produce opposing fluxes through their axes, a stationary sector-shaped magnetic vane positioned in said air gap and a second magnetic vane in said air gap mounted to move in an arc substantially parallel to and in close proximity to said stationary vane, said vanes being so shaped as to produce varying magnetic moments on each other at different rotative positions of said movable vane.

4. An electric measuring instrument of the magnetic vane type having a pair of substantially cylindrically-shaped energizing coils placed one inside the other and spaced apart to leave a substantially annularly-shaped air gap between them, said coils being connected to produce opposing fluxes through their axes and non-opposing fluxes through the air gap between them and relatively proportioned so that the flux inside the inner coil is reduced to substantially zero, and relatively movable magnetic vanes mounted in said intermediate air gap.

5. An electric measuring instrument of the magnetic vane repulsion type comprising a pair of substantially cylindrically-shaped energizing windings spaced apart one inside the other and connected to produce opposing fluxes through their axes, a stationary magnetic vane of tapering dimensions and a movable magnetic vane radially mounted with respect to each other in the space between the energizing coils and resilient means for opposing the repulsion torque between said magnetic vanes.

In witness whereof, I have hereunto set my hand this 15th day of October, 1926.

THEODORE A. RICH.